(12) United States Patent
Schwartz et al.

(10) Patent No.: US 9,949,078 B2
(45) Date of Patent: Apr. 17, 2018

(54) DETERMINING A CONTEXT-DEPENDENT VIRTUAL DISTANCE USING MEASUREMENTS OF STIGMERGIC INTERFERENCE

(71) Applicant: QUALCOMM Incorporated, San Diego, CA (US)

(72) Inventors: Adam Schwartz, Beit-Shemesh (IL); Isaac David Guedalia, Beit-Shemesh (IL); Sarah Glickfield, St. Louis, MO (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 14/822,403

(22) Filed: Aug. 10, 2015

(65) Prior Publication Data

US 2016/0066148 A1 Mar. 3, 2016

Related U.S. Application Data

(60) Provisional application No. 62/042,585, filed on Aug. 27, 2014.

(51) Int. Cl.
| | |
|---|---|
| *H04W 4/02* | (2018.01) |
| *H04W 4/00* | (2018.01) |
| *H04W 4/04* | (2009.01) |
| *H04W 52/28* | (2009.01) |

(52) U.S. Cl.
CPC ........... *H04W 4/023* (2013.01); *H04W 4/001* (2013.01); *H04W 4/028* (2013.01); *H04W 4/043* (2013.01); *H04W 52/283* (2013.01)

(58) Field of Classification Search
CPC ... H04W 52/283; H04W 4/028; H04W 4/043; H04W 4/001
See application file for complete search history.

(56) References Cited

U.S. PATENT DOCUMENTS

| | | | |
|---|---|---|---|
| 5,544,321 | A | 8/1996 | Theimer et al. |
| 7,158,021 | B2 | 1/2007 | Hammett |
| 8,364,728 | B2 | 1/2013 | Gnanasambandam et al. |
| 2010/0164479 | A1* | 7/2010 | Alameh ............... G01D 18/006 324/115 |
| 2011/0159920 | A1* | 6/2011 | Lehmann ............ H04M 1/0202 455/556.1 |
| 2012/0224711 | A1 | 9/2012 | Kim et al. |

(Continued)

OTHER PUBLICATIONS

International Search Report and Written Opinion—PCT/US2015/044672—ISA/EPO—dated Oct. 14, 2015.
Barron P., et al., "Using Stigmergy to Co-ordinate Pervasive Computing Environments," Sixth IEEE Workshop on Mobile Computing Systems and Applications, 2004, pp. 62-71.

(Continued)

*Primary Examiner* — Asghar Bilgrami
(74) *Attorney, Agent, or Firm* — Muncy, Geissler, Olds & Lowe, P.C.

(57) ABSTRACT

Systems and methods are disclosed for determining a context-dependent virtual distance based on stigmergic interference. The method may include obtaining environmental status information relating to an environment in proximity to a client device, calculating, based on the obtained environmental status information, the context-dependent virtual distance between the client device and a user of the client device, and controlling a user signaling pattern of the client device based on the calculated context-dependent virtual distance.

26 Claims, 7 Drawing Sheets

(56) References Cited

U.S. PATENT DOCUMENTS

| | | | |
|---|---|---|---|
| 2013/0281118 A1* | 10/2013 | Lipman | H04W 4/02 455/456.1 |
| 2014/0115059 A1 | 4/2014 | Van et al. | |
| 2014/0269442 A1* | 9/2014 | Hyde | H04W 4/02 370/259 |
| 2014/0273935 A1 | 9/2014 | Hyde et al. | |
| 2014/0357312 A1* | 12/2014 | Davis | G06F 3/0481 455/550.1 |
| 2015/0019714 A1* | 1/2015 | Shaashua | H04L 67/24 709/224 |
| 2015/0221049 A1* | 8/2015 | Colangelo | G06Q 50/16 705/313 |
| 2015/0244699 A1* | 8/2015 | Hessler | H04W 12/06 726/7 |
| 2015/0263833 A1* | 9/2015 | Li | H04L 5/0035 370/449 |
| 2015/0324181 A1* | 11/2015 | Segal | G06F 1/32 717/178 |

OTHER PUBLICATIONS

Castellano G., et al., "A multi-agent system for enabling collaborative situation awareness via position-based stigmergy and neuro-fuzzy learning," Neurocomputing, Jul. 5, 2014, vol. 135, pp. 86-97.
Keil D., et al., "Indirect interaction and decentralized coordination," Computer Science & Engineering Department, University of Connecticut, 2004, 14 pages, URL: http://www.researchgate.net/publication/228811197_Indirect_Interaction_and_Decentralized_Coordination/file/9fcfd50c22425baad0.pdf.

* cited by examiner

DETERMINING A CONTEXT-DEPENDENT VIRTUAL DISTANCE USING MEASUREMENTS OF STIGMERGIC INTERFERENCE

CROSS-REFERENCE TO RELATED APPLICATION

The present Application for Patent claims the benefit of U.S. Provisional Application No. 62/042,585, entitled "DETERMINING PROXIMITY USING MEASUREMENTS OF STIGMERGIC INTERFERENCE," filed Aug. 27, 2014, assigned to the assignee hereof, and expressly incorporated herein by reference in its entirety.

BACKGROUND

Aspects of this disclosure relate generally to telecommunications, and more particularly to interactions between user equipment and other devices in a shared wireless access environment.

Wireless access for client devices is improving continuously. Moreover, client devices have an increasing number of applications that consume ever-increasing amounts of power. In addition, persons with client devices often occupy an environment in which wireless access is shared with a number of other devices. These other devices may have specially tailored sensors and applications that diverge widely from the sensors and applications utilized by the client devices. Solutions are needed for making wireless devices that occupy a same environment faster, more functional, and more efficient.

SUMMARY

In one aspect, the present disclosure provides a method for determining a context-dependent virtual distance based on stigmergic interference. The method may comprise, for example: obtaining environmental status information relating to an environment in proximity to a client device, calculating, based on the obtained environmental status information, the context-dependent virtual distance between a user and the client device, and controlling a user signaling pattern of the client device based on the calculated context-dependent virtual distance.

In another aspect, the present disclosure provides a hub device for determining a context-dependent virtual distance based on stigmergic interference. The hub device may comprise, for example: a transceiver configured to obtain environmental status information relating to an environment in proximity to a client device, a processor configured to calculate, based on the obtained environmental status information, the context-dependent virtual distance between a user and the client device, and control a user signaling pattern of the client device based on the calculated context-dependent virtual distance, and a memory coupled to the processor and configured to store related data and instructions.

In another aspect, the present disclosure provides an apparatus for determining a context-dependent virtual distance based on traced activity. The apparatus may comprise, for example: means for obtaining environmental status information relating to an environment in proximity to a client device, means for calculating, based on the obtained environmental status information, the context-dependent virtual distance between a user and the client device, means for controlling a user signaling pattern of the client device based on the calculated context-dependent virtual distance, and means for storing data and instructions.

In another aspect, the present disclosure provides a non-transitory computer-readable medium comprising code, which, when executed by a processor, causes the processor to perform operations for determining a context-dependent virtual distance based on traced activity. The non-transitory computer-readable medium may comprise, for example, code for obtaining environmental status information relating to an environment in proximity to a client device, code for calculating, based on the obtained environmental status information, the context-dependent virtual distance between a user and the client device, and code for controlling a user signaling pattern of the client device based on the calculated context-dependent virtual distance.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
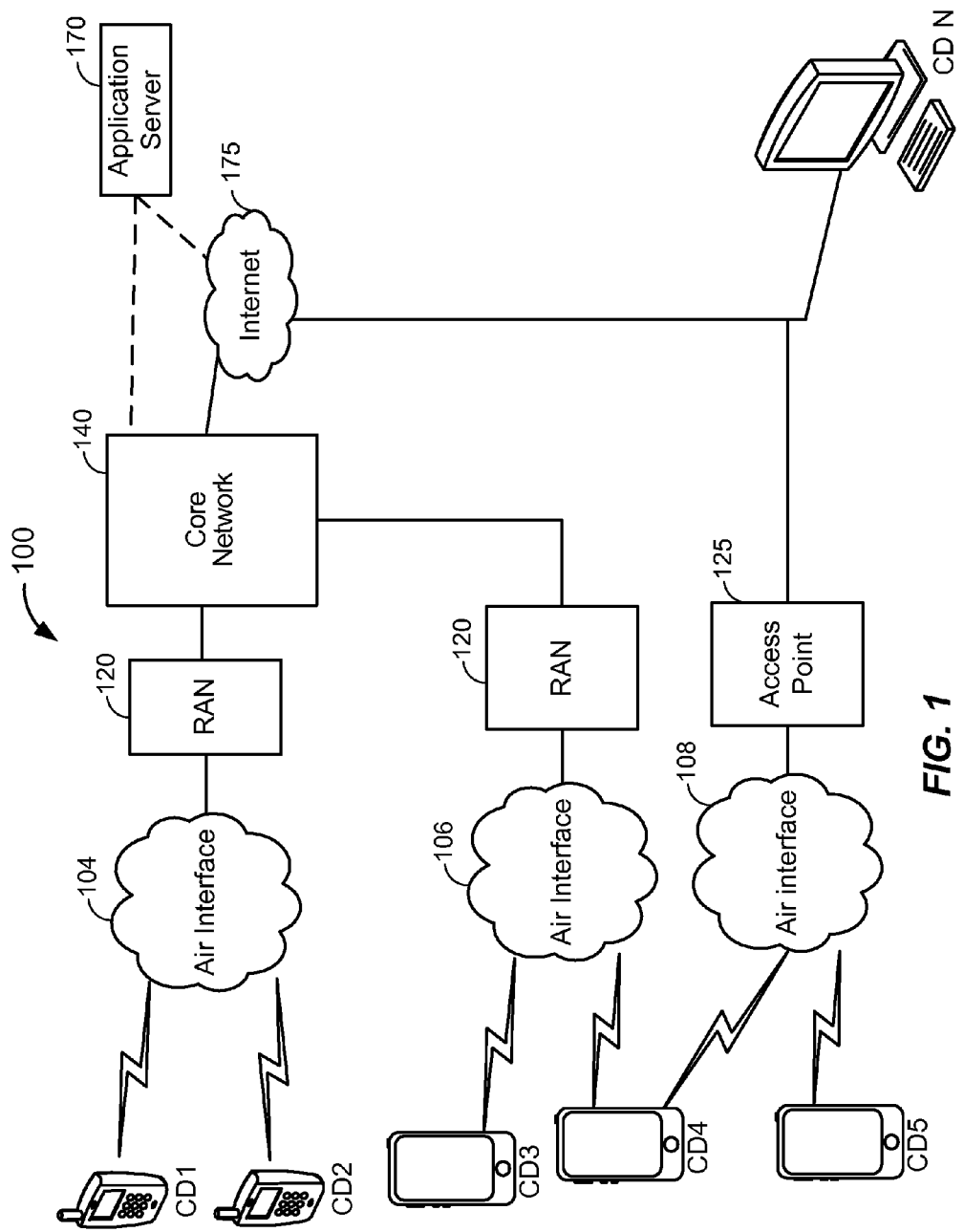
FIG. 1 generally illustrates a high-level system architecture of a wireless communications system in accordance with an aspect of the disclosure.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device may be mobile or stationary, and may communicate with a radio access network (RAN). As used herein, the term "client device" may be referred to interchangeably as an "access terminal" or "AT", a "wireless device", a "subscriber device", a "subscriber terminal", a "subscriber station", a "user terminal" or UT, a "user equipment" or "UE", a "mobile terminal", a "mobile device", a "mobile station", and/or variations thereof. Generally, client devices can communicate with a core network via the RAN, and through the core network the client devices can be connected with external networks such as the Internet. Of course, other mechanisms of connecting to the core network and/or the Internet are also possible for the client devices, such as over wired access networks, WiFi networks (e.g., based on IEEE 802.11, etc.) and equivalents thereof. Client devices can be embodied by any of a number of types of devices including but not limited to PC cards, compact flash devices, external or internal modems, wireless or wireline phones, and equivalents thereof. A communication link through which client devices can send signals to the RAN is called an uplink channel (e.g., a reverse traffic channel, a reverse control channel, an access channel, etc.). A communication link through which the RAN can send signals to client devices is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an aspect of the disclosure. The wireless communications system 100 contains client devices CD1-CD N. The client devices CD1-CD N can include cellular telephones, personal digital assistant (PDAs), pagers, a laptop computer, a desktop computer, and equivalents thereof. For example, in FIG. 1, client devices CD1 and CD2 are illustrated as cellular calling phones, client devices CD3, CD4, and CD5 are illustrated as cellular touchscreen phones or smart phones, and client device CD N is illustrated as a desktop computer or PC.

Referring to FIG. 1, client devices CD1-CD N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve client devices over air interfaces, such as the air interfaces 104 and 106. The access points in the RAN 120 can be referred to as access nodes or ANs, access points or APs, base stations or BSs, Node Bs, eNode Bs, and equivalents thereof. These access points can be terrestrial access points (or ground stations), or satellite access points. The RAN 120 is configured to connect to a core network 140 that can perform a variety of functions, including bridging circuit switched (CS) calls between client devices served by the RAN 120 and other client devices served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, client device CD N is shown as connecting to the Internet 175 directly (i.e., separate from the core network 140, such as over an Ethernet connection of WiFi or 802.11-based network). The Internet 175 can thereby function to bridge packet-switched data communications between client device CD N and client devices CD1-CD N via the core network 140. Also shown in FIG. 1 is the access point 125 that is separate from the RAN 120. The access point 125 may be connected to the Internet 175 independent of the core network 140 (e.g., via an optical communications system such as FiOS, a cable modem, etc.). The air interface 108 may serve client device CD4 or client device CD5 over a local wireless connection, such as IEEE 802.11 in an example. Client device CD N is shown as a desktop computer with a wired connection to the Internet 175, such as a direct connection to a modem or router, which can correspond to the access point 125 itself in an example (e.g., for a WiFi router with both wired and wireless connectivity).

Figure 2:
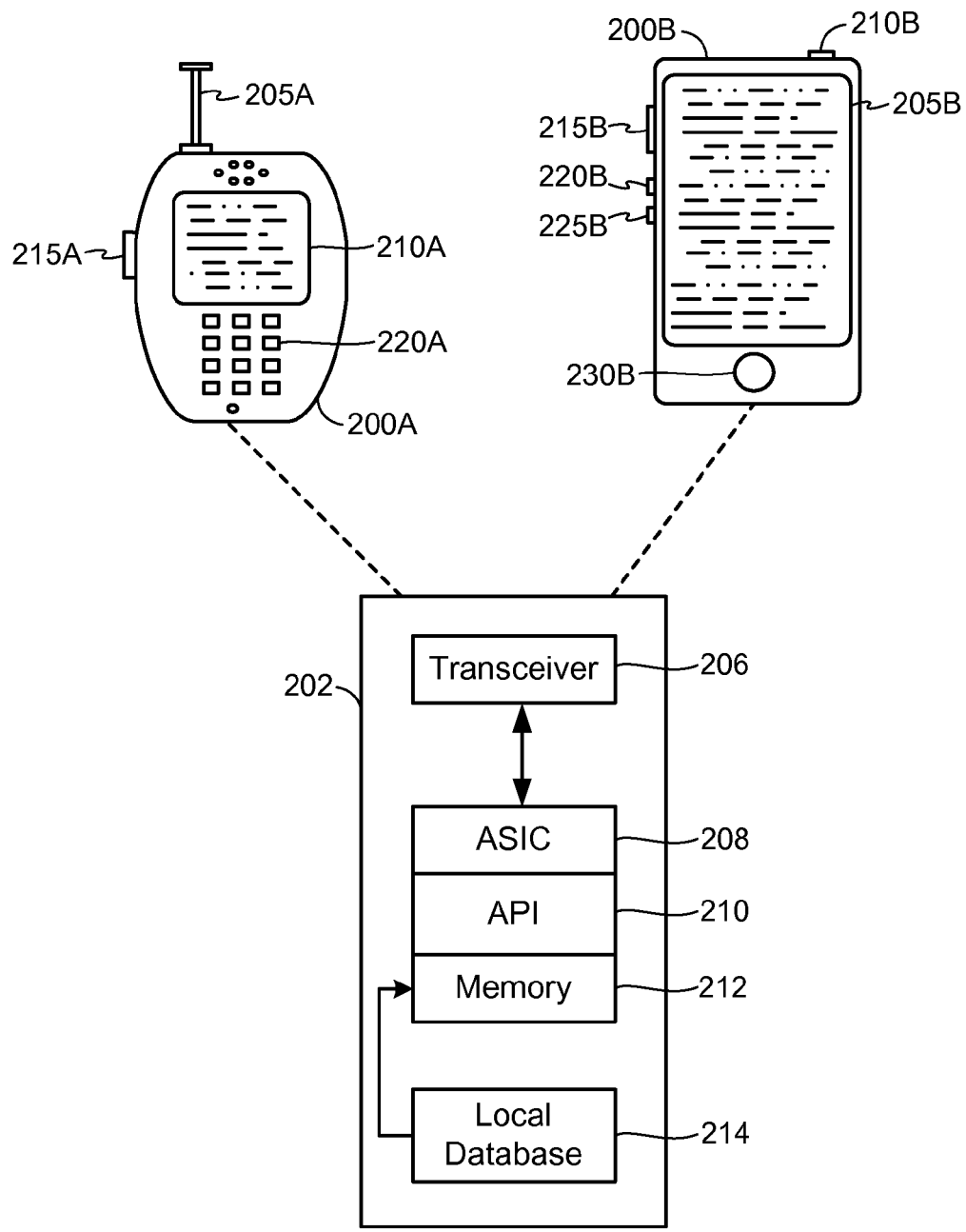
FIG. 2 generally illustrates examples of client devices in accordance with an aspect of the disclosure.

FIG. 2 illustrates examples of UEs in accordance with embodiments of the invention. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the invention is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
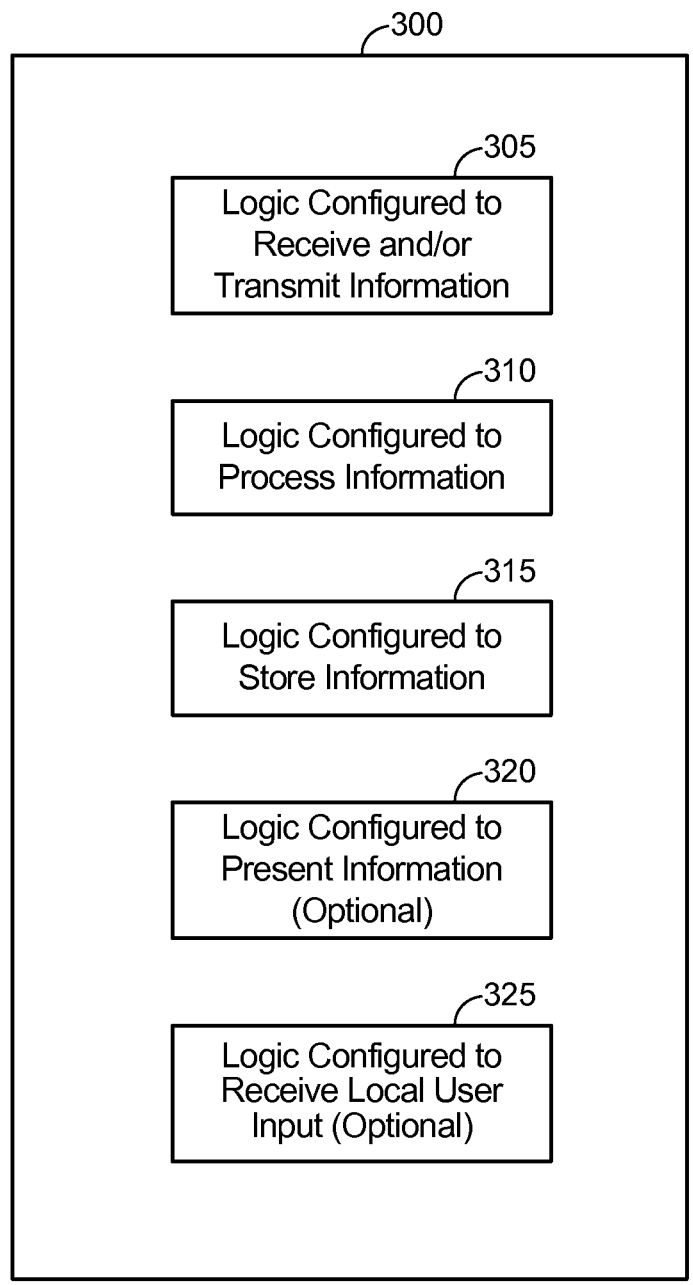
FIG. 3 generally illustrates a communication device that includes logic configured to perform communication functionality in accordance with an aspect of the disclosure.

FIG. 3 illustrates an example of a communication device 300 that includes logic configured to perform functionality. The communication device 300 can correspond to any of the above-noted communication devices, including but not limited to client devices 200A or 200B, any component of the RAN 120, any component of the core network 140, any components coupled with the core network 140 and/or the Internet 175, and so on. Thus, the communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., client devices 200A or 200B, Access Point 125, a BS, Node B or eNodeB in the RAN 120, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., application server 170, etc.), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the types of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, EPROM memory, EEPROM memory, registers, a hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to client device 200A or client device 200B as shown in FIG. 2, the logic configured to present information 320 can include the display 210A of client device 200A or the touchscreen display 205B of client device 200B. In a further example, the logic configured to present information 320 can be omitted for certain communication devices, such as network communication devices that do not have a local user (e.g., network switches or routers, remote servers such as the application server 170, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to client device 200A or client device 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers such as the application server 170, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics 305 through 325 can be borrowed or used by other configured logics 305 through 325 from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 4:
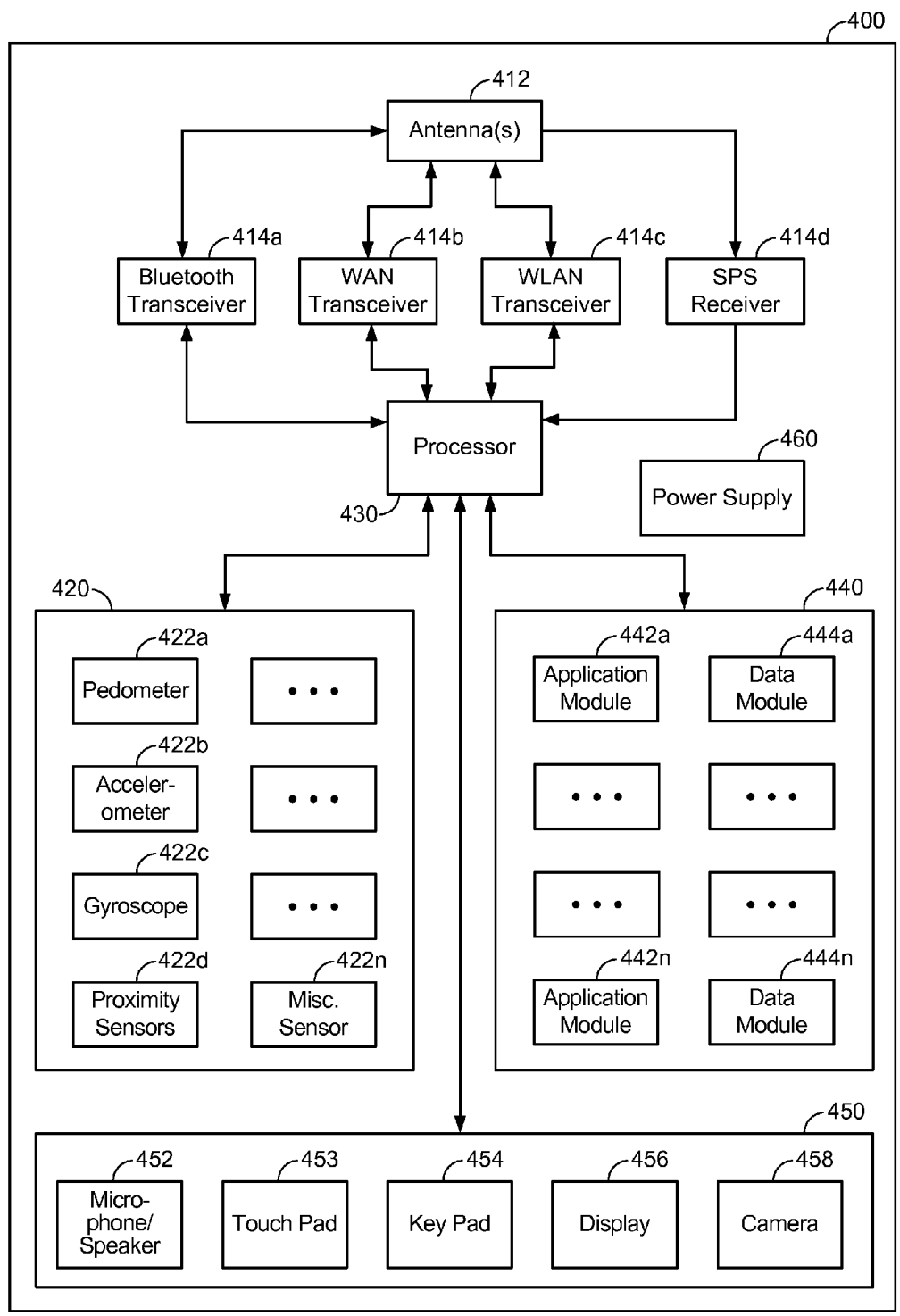
FIG. 4 generally illustrates a block diagram of a client device in accordance with an aspect of the disclosure.

FIG. 4 is a block diagram illustrating various components of a client device 400 according to an aspect of the disclosure. For the sake of simplicity, the various features and functions illustrated in the box diagram of FIG. 4 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 4 may be further subdivided, or two or more of the features or functions illustrated in FIG. 4 may be combined.

The client device 400 may include one or more Bluetooth transceivers 414a that may be connected to one or more antennas 412. The Bluetooth transceiver 414a comprises suitable devices, hardware, and/or software for communicating with and/or detecting signals to/from a Bluetooth access point such as Bluetooth access point and/or another Bluetooth transceiver in another device. Additionally or alternatively, the client device 400 may include one or more wide area network (WAN) transceiver(s) 414b that may be connected to one or more antennas 412. The WAN transceiver 414b comprises suitable devices, hardware, and/or software for communicating with and/or detecting signals to/from WAN-WAPs (wireless access points), and/or directly with other wireless devices within a network. In one aspect, the WAN transceiver 414b may be suitable for communicating with an LTE system, WCDMA system, CDMA2000 system, TDMA, GSM or any other type of wide area wireless networking technologies. Additionally or alternatively, the client device 400 may include one or more wireless local area network (WLAN) transceivers 414c that may be connected to one or more antennas 412. The WLAN transceiver 414c comprises suitable devices, hardware, and/or software for communicating with and/or detecting signals to/from LAN-WAPs, and/or directly with other wireless devices within a network. In one aspect, the WLAN transceiver 414c may comprise a WiFi (802.11x) communication system suitable for communicating with one or more wireless access points; however in other aspects, the WLAN transceiver 414c may comprise another type of local area network or personal area network. Additionally or alternatively, the client device 400 may include an SPS receiver 414d. The SPS receiver 414d may be connected to the one or more antennas 412 for receiving satellite signals. The SPS receiver 414d may comprise any suitable hardware and/or software for receiving and processing SPS signals. The SPS receiver 414d requests information and operations as appropriate from the other systems, and performs the calculations necessary to determine the position of client device 400 using measurements obtained by any suitable SPS algorithm. Additionally or alternatively, any other type of wireless networking technologies may be used, for example, Ultra Wide Band, ZigBee, wireless USB, etc.

The client device 400 may include one or more sensors 420. The one or more sensors 420 may collect data on the user, including data on the user's position, motion, environment, activities, or biometrics. The one ore more sensors 420 may include, for example, a pedometer 422a, an accelerometer 422b, a gyroscope 422c, proximity sensors 422d, for example, infrared proximity sensors, and/or any number of miscellaneous sensors 422n.

The client device 400 includes a processor 430. The processor 430 may be connected to the Bluetooth transceiver 414a, WAN transceiver 414b, WLAN transceiver 414c, the SPS receiver 414d and the one or more sensors 420. The processor 430 may include one or more microprocessors, microcontrollers, and/or digital signal processors that provide processing functions, as well as other calculation and control functionality.

The processor 430 may be coupled to memory 440, which stores data and software instructions for executing programmed functionality within the client device 400. The memory 440 may be on-board the processor 430 (e.g., within the same integrated circuit package), and/or the memory 440 may be external memory to the processor and functionally coupled over a data bus. The memory 440 may include any number of application modules 442a . . . 442n and any number of data modules 444a . . . 444n. One should appreciate that the organization of the memory contents as shown in FIG. 4 is merely exemplary, and as such the functionality of the modules and/or data structures may be combined, separated, and/or be structured in different ways depending upon the implementation of the client device 400.

While the modules shown in FIG. 4 are illustrated in the example as being contained in the memory 440, it is recognized that in certain implementations such procedures may be provided for or otherwise operatively arranged using other or additional mechanisms. For example, any of the application modules 442a . . . 442n may be provided in firmware. The processor 430 may include any form of logic suitable for performing at least the techniques provided herein. For example, the processor 430 may be operatively configurable based on instructions in the memory 440 to selectively initiate one or more routines that exploit motion data for use in other portions of the client device 400.

The client device 400 may include a user interface 450 which provides any suitable interface systems, such as a microphone/speaker 452, touch pad 453, keypad 454, display 456, and camera 458, that allow user interaction with the client device 400. The microphone/speaker 452 provides for voice communication services using the WAN transceiver 414b and/or the WLAN transceiver 414c. The touch pad 453 and/or keypad 454 comprise any suitable buttons for user input. The display 456 comprises any suitable display, such as, for example, a backlit LCD display, and may further include a touch screen display for additional user input.

Any input functionality such as the functionality demonstrated by microphone/speaker 452, touch pad 453, or keypad 454 may also be considered a sensor input analogous to the inputs of the one or more sensors 420. The camera 458 may similarly be used as a sensor, particularly in the event that one or more of application modules 442a . . . 442n comprises an image processor.

The client device 400 further includes a power supply 460, for example, a battery, for supplying power to the various components of the client device 400. However, it will be appreciated that client device 400 may not include all the elements illustrated and most likely will include only a subset of elements based on the requirements of the device and design considerations. Moreover, the Bluetooth transceiver 414a, WAN transceiver 414b, WLAN transceiver 414c, the SPS receiver 414d may be utilized as sensors to the extent that they can be used to generate data on the user's position, motion, environment, and/or activities. Accordingly, when the present disclosure refers to a sensor 420, it should be understood that this refers to any element of client device 400 that collects data. Moreover, when the present disclosure refers to sensors readings or sensor data, it should be understood that this refers to any readings or data collected by the client device 400, whether collected by the one or more sensors 420 or any other element of client device 400.

Figure 5:
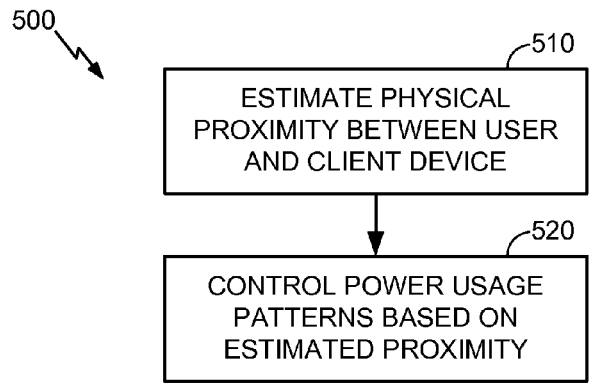
FIG. 5 generally illustrates a conventional method of operating a client device.

FIG. 5 generally illustrates a conventional method 500 of operating a client device. At 510, the client device estimates a physical proximity of the client device to a user associated with the client device. At 520, the client device controls power usage patterns based on the physical proximity estimated in 510.

In the simplest implementation of conventional method 500, the client device estimates physical proximity as a simple binary estimation as to whether the client device is close at hand with respect to the user. If, at 510, the client device estimates that the client device is not close at hand, then the client device reduces power usage patterns at 520. For example, the backlighting of the display may be turned off, thereby reducing power usage.

Figure 6:
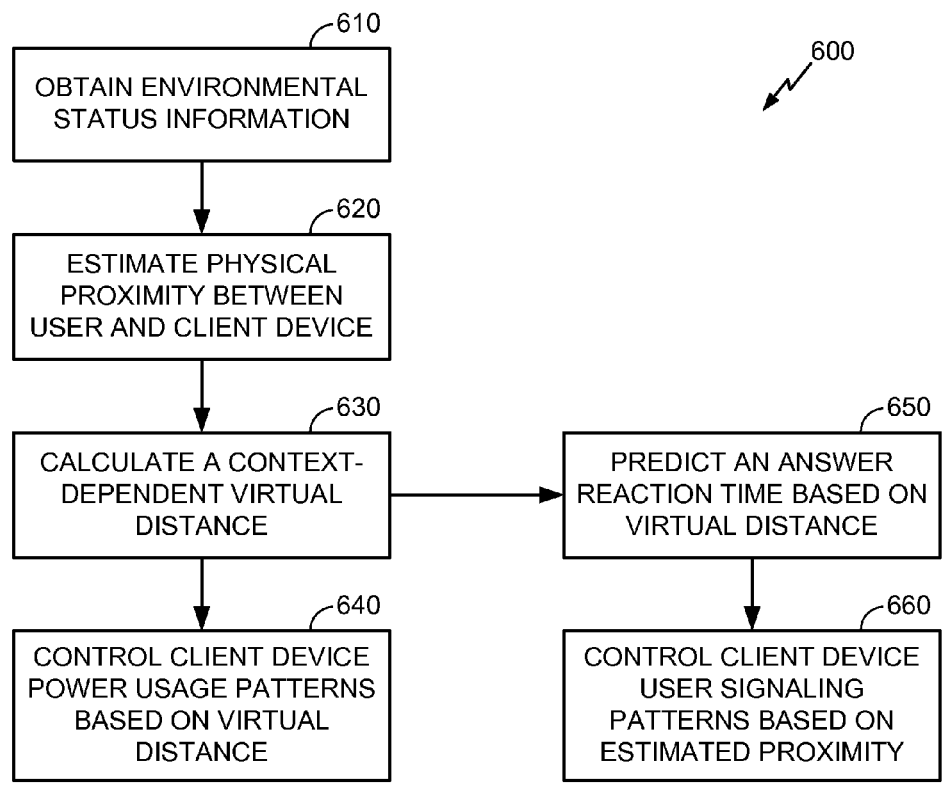
FIG. 6 generally illustrates a method of operating a hub device in accordance with an aspect of the disclosure.

FIG. 6 generally illustrates a method 600 of operating a hub device in accordance with an aspect of the disclosure. The hub device may control a client device that may be similar to, for example, client device 400 of FIG. 4. At 610, the hub device obtains environmental status information. The environmental status information may include any data associated with a wireless environment. The wireless environment may include any number of multiple wireless access points operating according to any number of wireless communication protocols. The wireless environment also includes at least one hub device and any number of client devices and/or other contextual devices having communication within the wireless environment. The contextual devices may be mobile or stationary with respect to the wireless environment, and the communication with other devices may be continuous or intermittent.

At 620, the hub device estimates a physical proximity between a user and a client device. Physical proximity can be estimated in any number of ways. A client device such as, for example, the client device 400 of FIG. 4, is equipped with a number of data modules 444*a* . . . 444*n* and application modules 442*a* . . . 442*n*, any number of which may be wholly or partially dedicated to the task of estimating physical proximity. Client device 400 is further equipped with one or more sensors 420 that can be used to estimate physical proximity. Moreover, as noted above, any element composing client device 400 that collects data may be used to estimate physical proximity.

The hub device may estimate physical proximity using data transmitted from the client device. Additionally or alternatively, the hub device may estimate physical proximity using data transmitted from elsewhere in the wireless environment. Moreover, the hub device may reside on the client device itself.

At 630, the hub device calculates a context-dependent virtual distance between the user and the client device. The virtual distance may depend on one or more of the physical proximity estimated at 620 or the environmental status information obtained at 610. According to one aspect of the invention, the calculated context-dependent virtual distance is incrementally increased based on an expectation that it will be dangerous, difficult, or inconvenient for the user to access the client device, and incrementally decreased based on an expectation that it will be safe, easy, or convenient for the user to access the client device.

At 640, the hub device may control power usage patterns of the client device based on the virtual distance calculated in 630. If the hub device resides on the client device, then this may be a simple matter of forwarding a command to various elements of the client device to power up, shut down, or incrementally adjust power consumption (for example, adjusting upwards or downwards). If the hub device resides elsewhere, then the instructions to power up or shut down will be transmitted to the client device.

At 650, the virtual distance calculated at 630 is used to predict an answer reaction time of the user. The answer reaction time may comprise the expected delay before a user interacts with the client device upon being signaled by the client device. The expected delay may vary in accordance with the reasons for signaling, for example, reception of a phone call or text message, and the type of signaling, for example, ringtone or visual alert.

At 660, the hub device controls user signaling patterns of the client device based on the answer reaction time predicted at 650. Additionally or alternatively, the hub device omits the step of predicting an answer reaction time at 650 and controls user signaling patterns of the client device based solely on the context-dependent virtual distance between the user and the client device calculated at 630. If the hub device resides on the client device, then control may be a simple matter of forwarding a command to various elements of the client device to signal the user in a specific manner. If the hub device resides elsewhere, then the instructions to signal the user in a specific manner will be transmitted to the client device.

Although FIG. 6 might imply that the estimation of physical proximity 620 occurs subsequent to the obtaining of environmental status information 610, it will be understood that there is no necessary sequence of events prior to calculation of a virtual distance 630. It will be understood that either of 610 or 620 could occur first, and that the other could occur simultaneously, later, or not at all. As noted above, the calculation of virtual distance 630 may comprise a weighted average in which a weight of zero is assigned to an estimated physical proximity if, for example, a confidence level does not exceed a given threshold or if no conclusive data has been obtained.

According to method 600, the environmental status information obtained at 610 may be used to augment the data on the physical proximity between a user and a client device estimated at 620. For example, suppose a first user has a first estimated physical proximity to a first client device and a second user has a second estimated physical proximity to a second client device. Moreover, the first estimated physical proximity and the second estimated physical proximity are substantially equal. Absent meaningful environmental status information, a hub device that is performing method 600 might predict equal answer reaction times (at 650) for both users. Moreover, the hub device might perform substantially similar control over power usage patterns (at 640) and user signaling patterns (at 660) for both client devices. However, if environmental status information is obtained at 610 and used to calculate a context-dependent virtual distance at 630, then the virtual distances associated with the first user and the second user might be substantially different from one another. Moreover, the answer reaction times predicted at 650 for both users might be substantially different, and the hub device might perform substantially different control over power usage patterns at 640 and user signaling patterns at 660 for both client devices.

Because the client device 400 of FIG. 4 is equipped with a number of data modules 444*a* . . . 444*n* and application modules 442*a* . . . 442*n*, it will be understood that the method 600 of operating a hub device may be adapted to calculate at 630 an independent context-dependent virtual distance for each of the application modules 442*a* . . . 442*n*. Additionally or alternatively, the hub device may calculate at 630 a baseline context-dependent virtual distance for the client device 400 and additionally calculate an independent adjustment to the baseline for each of the application modules 442*a* . . . 442*n* stored in client device 400.

Moreover, the control of power usage patterns at 640, the answer reaction time predicted at 650, and the control of client device user signaling patterns at 660 may also be independently determined for each of the application modules 442*a* . . . 442*n*. Additionally or alternatively, the hub device may calculate at 630 a baseline power usage pattern, baseline answer reaction time, and/or baseline user signaling pattern for the client device 400 and additionally calculate an independent adjustment for each of the application modules 442*a* . . . 442*n* stored in client device 400.

Figure 7:
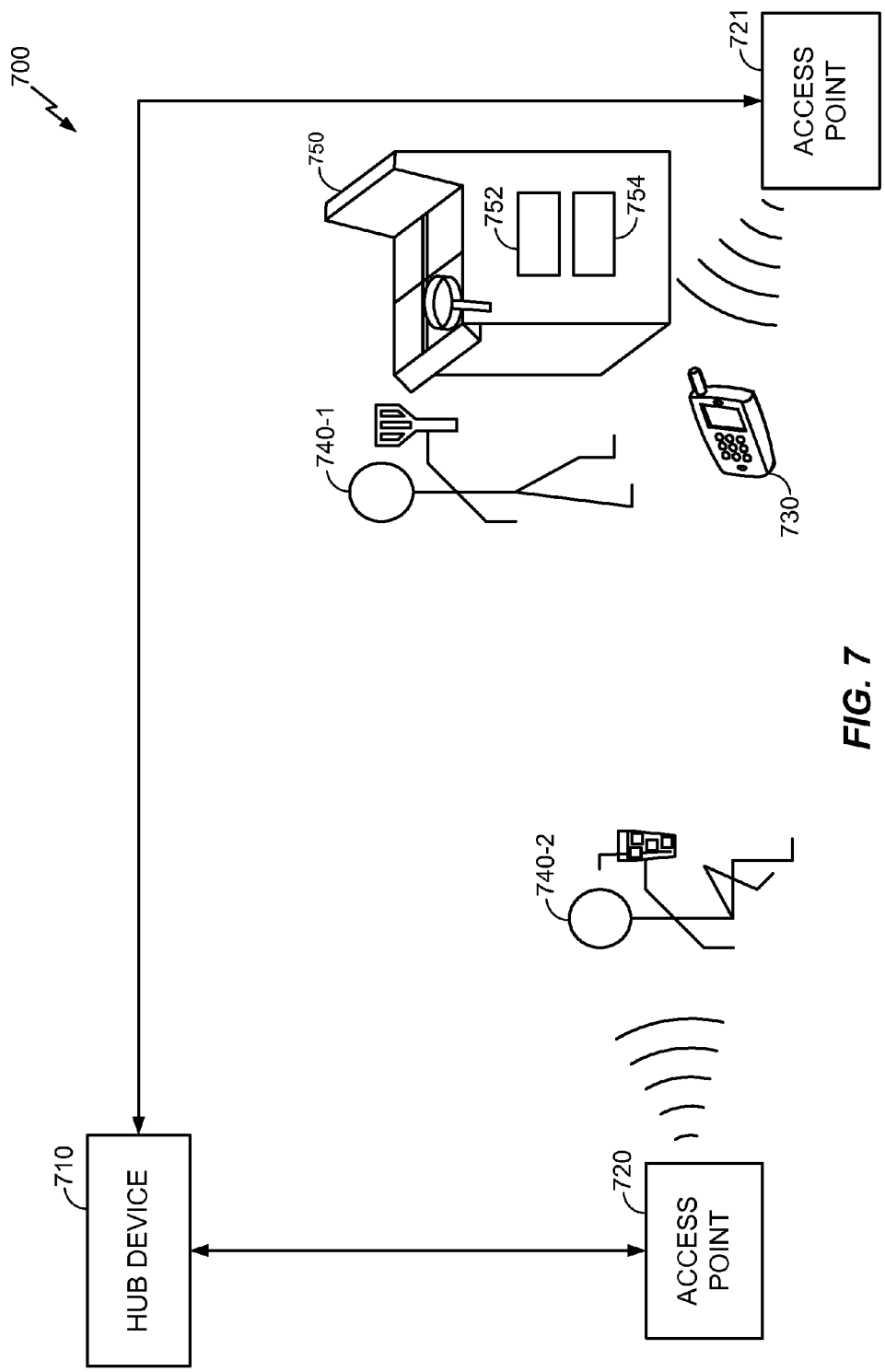
FIG. 7 generally illustrates a high-level system architecture of a wireless environment in accordance with an aspect of the disclosure.

FIG. 7 generally illustrates a high-level system architecture of a wireless environment 700 in accordance with an aspect of the disclosure. The wireless environment 700 includes a hub device 710, access points 720-1, 720-2, a client device 730, and a user 740. The user 740 is depicted at 740-1 and 740-2 in two different scenarios (for example, at different times). FIG. 7 further comprises a contextual device 750 comprising at least one contextual sensor 752 and at least one transceiver 754.

The contextual device 750 is depicted as a familiar appliance, in particular, an oven-stovetop combination kitchen appliance. In this illustration, the contextual device 750 is equipped with a contextual sensor 752 which may sense, for example, that a heating element on the stovetop has been turned on. This sensor data collected by the contextual sensor 752 may be used as an indication that somebody, for example, user 740-1, is cooking. The sensor data may be communicated to the hub device 710 using the transceiver 754. The transceiver 754 may communicate with the hub device 710 using any of the communication methods set forth in the present disclosure. Moreover, the transceiver 754 may communicate directly with the hub device 710 or indirectly via the access points 720-1, 720-2, the client device 730, and/or other contextual devices 750. In yet another possible scenario, the hub device 710 is nested within the contextual device 750, within the client device 730, or in a remote device disposed remotely from the wireless environment 700.

Although contextual device 750 is depicted as an oven-stovetop combination kitchen appliance in a domestic setting, it will be understood that contextual device 750 may comprise any device equipped with at least a contextual sensor 752 and transceiver 754. Moreover, a wireless environment 700 may include any number of contextual devices 750 and the hub device 710 may compile environmental status information based on data gathered from the respective contextual sensors 752 of every contextual device 750 within the wireless environment 700. The wireless environment 700 comprising one or more contextual devices 750 may be an Internet of Things (IoT) environment.

At 740-1 of FIG. 7, the user 740 is depicted with a spatula, cooking. The client device 730, belonging to or associated with user 740, is depicted nearby. In one possible scenario, the user 740-1 is unlikely to interact with client device 730 while cooking. Accordingly, user 740-1 is less likely to interact with the client device 730 for as long as contextual sensor 752 determines that the stovetop is being used.

The hub device 710, by compiling data collected by contextual sensor 752 to generate environmental status information, can indirectly trace the activity of the user 740. The transmission of sensor data from contextual device 750 to hub device 710 constitutes a stigmergic communication indicating traced activity. If the hub device 710 determines that the traced activity linked with contextual device 750 is likely to affect the behavior of a user 740-1 with respect to an associated client device 730, then the hub device 710 can advantageously modify or control the behavior of client device 730 so as to make it more effective and/or more efficient. Although the hub device 710 is depicted in the same figure as client device 730, user 740, and contextual device 750, it will be understood that the hub device 710 may be remote from the client device 730, user 740, and the contextual device 750. In such a scenario, the hub device 710 may communicate with the wireless environment 700 via a network.

In the stovetop scenario depicted in FIG. 7, the data collected by contextual sensor 752 may indicate the presence of a stigmergic interference with respect to interactions between user 740-1 and associated client device 730. In particular, the contextual device 750 indicates that user 740-1 is interacting with the stovetop, and therefore less likely to interact with client device 730. The hub device 710 can then calculate a context-dependent virtual distance between the user 740-1 and the client device 730. The hub device 710 calculates virtual distance data by utilizing environmental status information (compiled contextual sensor data) to supplement or replace physical proximity data.

The utilization of environmental status information to supplement or replace physical proximity data is illustrated with reference to user 740. In FIG. 7, user 740-1 and user 740-2 are the same individual depicted at different times. At a first time, user 740 (labeled 740-1) is depicted cooking. At a second time, perhaps later in the evening, user 740 (labeled 740-2) is depicted enjoying a drink. Regardless of the time, the client device 730 is depicted near the cooking area, perhaps laying on a kitchen counter. The client device 730 is depicted as being in close proximity to user 740-1 while user 740-1 is cooking, and not in close proximity to user 740-2 while user 740-2 is enjoying a drink later in the evening.

At the first time, the client device 730 is physically proximate to user 740-1. If the hub device 710 controls a power usage and/or user signaling pattern for the client device 730 based solely on physical proximity, then the hub device 710 may improperly conclude that high levels of power usage and/or certain types of user signaling are appropriate while user 740-1 is cooking. If, by contrast, control of power usage and user signaling is informed by environmental status information indicating stigmergic interference, the hub device 710 can perform improved control. For example, even though user 740-1 and client device 730 are in close proximity at the first time, the hub device 710 may conclude that the user 740-1 is not likely to desire interaction with the client device 730. The hub device 710 can draw this conclusion because the contextual device 750 indicates that user 740-1 is cooking. Because the hub device 710 recognizes the stigmergic interference of the stovetop, the hub device 710 can facilitate effective and efficient operation of client device 730 based on a context-dependent virtual distance between user 740-1 and the client device 730, rather than physical proximity alone. For example, the calculated context-dependent virtual distance may be increased based on an expectation that it will be difficult for the user to access the client device, or that the user will travel indirectly to the client device to answer a given communication with a given communication type.

At the second time, user 740-2 and client device 730 are not in close proximity. If the hub device 710 controls levels of power usage and/or user signaling for the client device 730 based solely on physical proximity, then the hub device 710 may improperly conclude that low levels of power usage and/or certain types of user signaling are appropriate while user 740-2 is relaxing with a drink. If, by contrast, control of power usage and user signaling is informed by environmental status information indicating stigmergic interference, the hub device 710 can perform improved control. For example, even though user 740-2 and the client device 730 are not in close proximity at the second time, the hub device 710 may conclude that the user 740-2 is not distracted by other activities (such as cooking), and likely to desire interaction with the client device 730. The hub device 710 can draw this conclusion because the contextual device 750 indicates that the stovetop is off. Once again, the hub device 710 can facilitate effective and efficient operation of client device 730 by calculating a context-dependent virtual distance that accounts for the fact that user 740-2, though not in close proximity to the client device 730, is not distracted by other activities.

Figure 8:
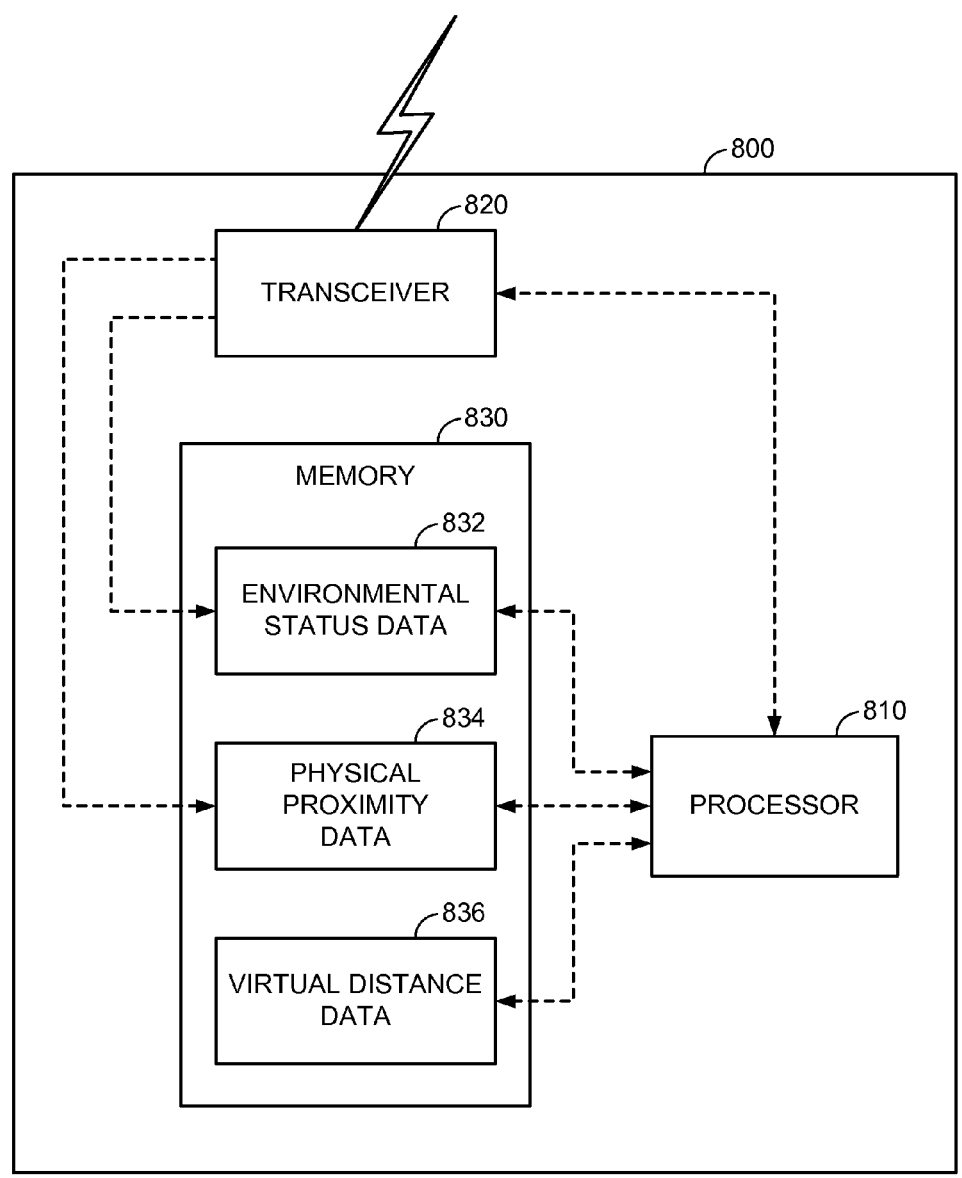
FIG. 8 generally illustrates a high-level system architecture of a hub device in accordance with an aspect of the disclosure.

FIG. 8 generally illustrates a high-level system architecture of a hub device 800 in accordance with an aspect of the disclosure. The hub device 800 may be analogous to the hub device 710 depicted in FIG. 7. The hub device 800 comprises a processor 810, a transceiver 820, and a memory 830 comprising an environmental status data module 832, a physical proximity data module 834, and a virtual distance data module 836. The transceiver 820 transmits commands or other data from the processor 810 and receives commands or other data from outside of the hub device 800. The transceiver 820 may also be configured to relay data to and from the processor 810 and/or memory 830.

The environmental status data module 832 stores environmental status information associated with at least one wireless environment. The environmental status information may comprise sensor data gathered from any number of contextual devices analogous to contextual device 750. The environmental status information may be limited to the present statuses of one or more contextual devices 750. However, it may include past statuses as well, and may include additional data including time stamps, usage counts, etc., indicating usage habits. For example, hub device 710 may perform tracking of interactions between the user and the client device and changes in environmental status information, and the environmental status data module 832 may be used to store data on the correlation between client device/user interactions and certain environmental conditions. The data stored in the environmental status data module 832 may subsequently be used to calculate a context-dependent virtual distance.

The physical proximity data module 834 receives and stores data on a physical proximity of a user such as user 740 to a client device associated with the user 740, such as client device 730. In one possible scenario, proximity data is obtained using proximity sensors such as proximity sensors 422d with which the client device 730 is equipped. For example, if the keypad 454 of the client device 730 is presently being operated, then a close physical proximity can be established. In another possible scenario, both the client device 730 and user 740 are separately equipped with sensors which work in tandem to generate a proximity value. In yet another possible scenario, the respective positions of the client device 730 and user 740 are measured individually and the estimation of physical proximity is based on a difference between the two values. The position of a client device 730 may be individually determined, for example, based on position dead reckoning techniques, or through interactions with one or more access points 720-1, 720-2 using round trip time (RTT) measurements and/or received signal strength indications (RSSI). For example, hub device 710 may track interactions between the user and the client device and changes in an estimated physical proximity between the user and the client device, and physical proximity data module 834 may be used to store data on the correlation between client device/user interactions and an estimated physical proximity. The data stored in physical proximity data module 834 may also be used to recognize tendencies that help to estimate present or future physical proximity. The data stored in physical proximity data module 834 may subsequently be used to calculate a context-dependent virtual distance. In some scenarios, past tendencies stored in physical proximity data module 834 may be one of the most reliable indicators of present physical proximity.

The position of a user such as user 740 may be individually determined, for example, through direct measurement in a wireless environment that includes, for example, infrared cameras or sensors. The position of a user 740 may also be determined by utilizing environmental status information. In a simple illustration, the use of a thermostat in one room of a house may indicate the presence of user 740 in that room. In a more complex example, if a series of data points indicate that the position of client device 730 is converging on a known position of contextual device 750, and contextual sensor 752 subsequently indicates that, for example, the contextual device 750 has been turned on, then hub device 800 may conclude that the position of user 740 is the same as the known position of the contextual device 750 for the duration of the time that the environmental status information indicates usage of the contextual device 750. If a contextual device 750 has a known static position or positions, this data may be stored in environmental status data module 832 and/or some other data module not depicted in FIG. 8, for example, a module for miscellaneous data, or a remote server accessible via transceiver 820.

The physical proximity data module 834 may include data on past proximities and may include additional data including time stamps, confidence levels, or other such data. Personal habits, collected over time in the form of physical proximity data, may indicate a probable present position of one or more of client device 730 and/or user 740 based on, for example, time of day, thermostat settings, recent operation of an automatic garage door opener, or other such data.

The virtual distance data module 836 may include data that combines proximity data stored in physical proximity data module 834 with environmental status information stored in environmental status data module 832. The processor 810 calculates virtual distance data in accordance with a formula or algorithm. The virtual distance data may be a simple weighted average of the proximity data and environmental status information. Additionally or alternatively, the weights given to proximity data and environmental status information, respectively, may change due to any number of factors, including confidence levels with respect to specific data, indications of habit, including records of past behavior, and/or specific instructions given by the user.

The operation of hub device 710 will be explained with reference to the foregoing stovetop example. In the stovetop example, user 740-1 turns on the stovetop, which is sensed by the contextual sensor 752 provided in contextual device 750. The transceiver 754 transmits a signal indicating that the stovetop has been turned on. The signal is received by, for example, access points 720-1, 720-2, and relayed to the hub device 710. Alternatively, the signal may be transmitted directly to hub device 710, which, as can be seen in FIG. 8, includes a transceiver 820. In yet another alternative, the hub device 710 resides within client device 730, and the signal is transmitted directly from transceiver 754, or relayed to client device 730 via access points 720-1, 720-2, or received at client device 730 via any of Bluetooth transceiver 414a, WAN transceiver 414b, or WLAN transceiver 414c, as shown in FIG. 4. The hub device 710 may obtain environmental status information according to at least any one of the foregoing methods.

Next, the hub device 710 estimates a physical proximity between user 740-1 and the client device 730. In one possible scenario, one or more of the pedometer 422a, accelerometer 422b, or gyroscope 422c of client device 730 may sense that client device 730 has been laid flat. From this data, the hub device 710 might conclude that client device 730 has been set aside by user 740-1, and therefore at an indeterminate proximity. The position of the client device 730 may be determined through interactions with one or more access points 720-1, 720-2 using round trip time (RTT) measurements and/or received signal strength indications (RSSI). However, knowledge of the position of only the client device 730 may not be sufficient to determine the proximity of client device 730 to the user 740-1. If the wireless environment 700 is equipped with, for example, infrared cameras, the position of user 740-1 may be measured directly and compared to the known position of client device 730 to estimate a physical proximity value. It also may be possible to use one or more of proximity sensors 422d, microphone/speaker 452 and/or camera 458 to determine whether user 740-1 is in the immediate proximity of the client device 730. In yet another example, the environmental status information obtained by the hub device 710 when the stovetop was turned on may be useful for determining the physical proximity of client device 730 to user 740-1. For example, if the position of client device 730 is known as a result of, for example, RSSI measurements, then the proximity data may be estimated as a distance from the stovetop. This approach assumes that the stovetop (or other contextual device 750) has a known position, and that the user 740-1 is in the vicinity of the stovetop. If both of the assumptions are true, then the calculated distance of client device 730 from the stovetop (or other contextual device 750) can be estimated as a fairly precise estimate of the proximity of client device 730 to user 740-1. In yet another example, the hub device 710 obtains environmental status information from an altogether different contextual device 750.

In the stovetop example, environmental status information is obtained that indicates that the user 740-1 is using the contextual device 750, and a physical proximity is estimated that indicates the client device 730 is in close proximity to user 740-1, but not actually on the user's person. The hub device 710 calculates a virtual distance based on this information. In this case, we consider use of the stovetop to be the type of occupation which would prevent user 740-1 from engaging in frequent interaction with client device 730. Therefore, the hub device 710 may calculate a virtual distance that takes the physical proximity into account, but lengthens the virtual distance relative to the physical proximity based on the obtained environmental status information. According to this example, the hub device 710 recognizes that engagement of the stovetop indicates a higher level of stigmergic interference, and therefore, a greater virtual distance. It will be understood that some contextual devices 750, like a stovetop, will correlate highly with stigmergic interference, whereas other contextual devices 750 will have low correlation or no correlation with stigmergic interference. Still other contextual devices 750 may have an inverse correlation with stigmergic interference, thereby suggesting that the virtual distance calculated by hub device 710 should be decreased relative to physical proximity, rather than increased. For example, a user 740 may be more likely to interact with client device 730 when the radio is tuned to a "top 40" station. Data that relates a given contextual device 750 to an expected level of stigmergic interference may be stored at virtual distance data module 836 and used to calculate virtual distance.

While the inherent nature of the contextual device 750 may suggest a certain level of stigmergic interference, it is also likely the different users of the contextual device 750 will exhibit different levels of stigmergic interference relative to the same contextual device 750. Moreover, different uses of the contextual device 750 may indicate different levels of stigmergic interference. For example, a first user who watches golf may not mind being disturbed by client device 730 when the television set is on, or may in fact invite interruption. A second user who watches mysteries may be slightly more engaged in the television, and less likely to interact with client device 730. A third user who uses the television to play multiplayer video games over a network may be highly unlikely to interact with client device 730 while the television set is being operated. A virtual distance calculation will account for the fact that the television is on, but will also account for who is using the contextual device 750 and/or how the contextual device 750 is being used. Data on an association between certain users of a contextual device 750, certain uses of a contextual device 750, and a level of stigmergic interference may be stored at virtual distance data module 836 and used to calculate virtual distance. Moreover, different time durations will also be associated with specific environmental status information. For example, although the stovetop represents a stigmergic interference at the time it is being used (because the user 740-1 is cooking), it may also represent a stigmergic interference for a duration of time after it has stopped being used (because the user 740-1 is presumably eating what has been cooked). The virtual distance calculated by hub device 710 may be different while the stovetop is being used from the virtual distance calculated during the hour after the stovetop has been turned off, and may be yet another value after the hour has passed.

The inherent nature of the client device 730 may also have an effect on the calculated virtual distance. For example, a smartphone may be associated with smaller virtual distances than an e-book reader. Moreover, the applications currently running on the client device 730 may also be taken into account. Although the e-book reader may generally be associated with greater virtual distances, certain applications on the e-book reader may indicate short virtual distances, whereas certain applications on the smartphone may indicate longer virtual distances.

In the stovetop example, the hub device 710 controls power usage patterns of the client device 730 based on the virtual distance calculated at 630. Generally, a greater virtual distance indicates that interaction between client device 730 and user 740 is less likely, and that lower power usage is necessary. By operating in a low power mode at a time when the client device 730 is less likely to be used, power can be conserved, and the client device 730 can be made more efficient.

In the stovetop example, the hub device 710 predicts an answer reaction time based on the virtual distance. Because the user 740-1 is cooking, it is unlikely that a user signal emitted by the client device 730 (such as a ring tone or notification alert) will be immediately answered. The length of time it takes the user 740-1 to react to the user signal will be related to the virtual distance calculated at 630. It will be understood that under some circumstances, no answer at all would be expected. The hub device 710 may attempt to predict an answer reaction time based on the inherent nature of the contextual device 750 or typical answer times associated with the user 740. However, past behavior may be the best indication of future answer reaction times. Therefore, the hub device 710 may record reaction times of the user 740 and store them at virtual distance data module 836 or some other module (not shown). The hub device 710 may also record reaction time associated with a given contextual device 750. This data may help the hub device 710 to better predict an answer reaction time.

In the stovetop example, the hub device 710 controls user signaling patterns of the client device 730 based on the virtual distance calculated at 630. Because the user 740-1 is cooking, it is unlikely that the user 740-1 will want to be disturbed by low-priority notifications. Therefore, the hub device 710 may constrain its user signaling patterns until a lower level of stigmergic interference is indicated. If, however, a high-priority notification is necessary, the hub device 710 may lengthen or strengthen its user signaling patterns so as to get the attention of user 740-1. If, for example, a given answer reaction time is predicted at 650, then the hub device 710 may indicate that the minimum duration for a user signal emitted by client device 730 would be at least equal to the predicted answer reaction time. Moreover, the strength of the user signal emitted by the client device 730 may also be increased. Additionally or alternatively, the user signal may be relayed to the user 740-1 via the contextual device 750.

In order to efficiently control user signaling patterns, the hub device 710 may need to ascertain the priority levels of respective user signals. For example, the communication type may be taken into account. A communication type such as an incoming call may be of a higher priority that other types of communication, e.g., text message, email, application-related notification, or device-related notification. In addition to communication type, user habits or direct user input may be taken into account for ascertaining the priority of communications. A higher-priority communication may cause the client device 730 to emit a stronger user signaling pattern.

In one possible scenario, the strength of the user signaling pattern emitted by the client device 730 may be increased or decreased based on a competing user signal emitted by the contextual device 750. For example, a marginal increase in ambient noise caused by use of a contextual device 750 such as a stovetop may be taken into account when the client device 730 signals user 740-1. The client device 730 may slightly increase the strength of the user signaling pattern in response to an indication that the user 740-1 is using the stovetop. For particularly loud contextual devices, for example, a stereo, a particularly strong user signaling pattern may be necessary. Additionally or alternatively, a visual user signaling pattern may replace or supplement an audible user signaling pattern. Once again, the user signaling pattern may be relayed via the contextual device 750 being used. Additionally or alternatively, a different contextual device 750 may be utilized for relaying the user signaling pattern.

Although the contextual device 750 comprised a stovetop in many of the illustrative examples, it will be understood that any device having a sensor and a transceiver may constitute a contextual device 750 in a wireless environment. In one of many possible scenarios, the contextual device 750 is a coffee pot and the environmental status information indicates that the coffee pot is beeping because, for example, the coffee has finished brewing. In this scenario, the hub device 710 may calculate a relatively higher virtual distance between the client device 730 and the user 740 because the hub device 710 concludes with some degree of certainty that user 740 may be preparing, pouring, or transporting a cup of coffee. A conclusion that user 740 is using the coffee maker may be supplemented by data on the physical position of the user 740 and/or the user's client device 730. The hub device 710 may increase the calculated answer reaction time based on this conclusion and control the power usage patterns or user signaling patterns accordingly. The hub device 710 may further conclude that, for example, ten minutes after coffee has been fetched, the user is particularly inclined to interact with client device 730. The hub device 710 would accordingly reduce the calculated virtual distance.

In another possible scenario, the contextual device 750 is an electrical light switch or other switch in a bathroom. In this scenario, the virtual distance may be lengthened with respect to some types of communication, for example, interactive audio or video communications, but shortened with respect to others communication types, for example, non-interactive audio, video, or textual communication types. Moreover, the calculated virtual distance may be particularly sensitive to physical proximity data in such a scenario. In other words, if the physical proximity of the client device 730 to the user 740 is very small, for example, within hand's reach, then the virtual distance is calculated to be very low. If the physical proximity of the client device 730 to the user 740 is very large, for example, the client device 730 is not inside the bathroom, then the virtual distance is calculated to be very high. In the latter scenario, the predicted answer reaction time may be increased up to a duration typical of the time it takes before the user 740 exits the bathroom.

In another possible scenario, the contextual device 750 is a bicycle. In this scenario, the physical proximity may be quite low if, for example, the client device 730 is in the back pocket of the user 740. However, the calculated virtual distance may be much higher than the estimated physical proximity. On the other hand, the bicycle may be a stationary exercise bicycle, and the client device 730 may be resting on a magazine rest installed on the exercise bicycle. In this scenario, the hub device 710 may conclude (based on, for example, a comparison of a measured position of the client device 730 with a measured or known position of the exercise bicycle) that the virtual distance is very short.

In an Internet of Things (IoT) environment, virtually any object or application that has multiple states can compose a contextual device 750 that provides information about one or more users 740. Moreover, any object or application can be modified with a contextual sensor 752 and transceiver 754 such that it can be used as a contextual device 750. This information can then be used to control the power usage patterns or user signaling patterns of a client device 730 associated with the user 740.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., client device). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a non-transitory computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method, comprising:
   obtaining environmental status information relating to an environment that includes a client device;
   estimating a physical proximity value corresponding to a physical distance between the client device and a user of the client device;
   determining a virtual distance value that is different from the physical proximity value, wherein the determining comprises increasing or decreasing the physical proximity value based on the obtained environmental status information to arrive at the virtual distance value; and
   controlling a user signaling pattern of the client device based on the virtual distance value.

2. The method of claim 1, wherein:
   estimating the physical proximity value comprises estimating a first physical proximity between a first user and a first client device, and the method further comprises estimating a second physical proximity value between a second user and a second client device within the environment, wherein the first physical proximity value and the second physical proximity value are substantially equal; and
   the determining of the virtual distance value comprises calculating a first virtual distance value based on both the obtained environmental status information and the estimated first physical proximity value, and the method further comprises calculating a second virtual distance value based on both the obtained environmental status information and the estimated second physical proximity value, wherein the first virtual distance value and the second virtual distance value are substantially different.

3. The method of claim 1, wherein the determining of the virtual distance value further comprises increasing or decreasing the physical proximity value based on a client device type of the client device.

4. The method of claim 1, wherein the determining of the virtual distance value further comprises increasing or decreasing the physical proximity value based on a contextual device type of the one or more contextual devices.

5. The method of claim 1, further comprising:
   predicting, based on the virtual distance value, an answer reaction time of the user in response to the user signaling pattern,
   wherein controlling the user signaling pattern comprises controlling the user signaling pattern based on the predicted answer reaction time.

6. The method of claim 5, wherein:
   wherein the virtual distance value is increased based on an expectation that it will be difficult for the user to access the client device, and
   wherein the predicted answer reaction time is increased based on the increase of the virtual distance value.

7. The method of claim 5, wherein:
   wherein the virtual distance value is increased based on an expectation that the user will travel indirectly to the client device to answer a given communication with a given communication type, and
   wherein the predicted answer reaction time is increased based on the increase of the virtual distance value.

8. The method of claim 5, wherein:
   wherein the virtual distance value with respect to an interactive video and/or audio interactions is increased relative to the virtual distance value with respect to non-interactive video, audio, and/or textual interactions,
   wherein the predicted answer reaction time with respect to the interactive video and/or audio interactions is increased relative to the predicted answer reaction time with respect to the non-interactive video, audio, and/or textual interactions.

9. The method of claim 1, wherein the method is performed in the client device, in another client device, or in a remote device.

10. The method of claim 1, wherein the environment is an Internet of Things (IoT) environment.

11. The method of claim 1, further comprising:
tracking at least one of (i) interactions between the user and the client device, (ii) changes in the environmental status information, (iii) changes in the physical proximity value corresponding to the physical distance between the user and the client device, or (iv) a combination thereof;
wherein the determining of the virtual distance value further comprises determining the virtual distance value based on the at least one of (i) the interactions between the user and the client device, (ii) changes in the environmental status information, (iii) changes in the physical proximity value corresponding to the physical distance between the user and the client device, or (iv) the combination thereof.

12. The method of claim 1, further comprising:
adjusting a power usage pattern based on the virtual distance value.

13. A hub device, the hub device comprising:
a transceiver configured to obtain environmental status information relating to an environment that includes a client device, wherein the environmental status information is obtained from one or more contextual devices associated with the environment in proximity to the client device;
a processor configured to:
estimate a physical proximity value corresponding to a physical distance between the client device and a user of the client device;
determine a virtual distance value that is different from the physical proximity value, wherein the determining comprises by increasing or decreasing the physical proximity value based on the obtained environmental status information to arrive at the virtual distance value; and
control a user signaling pattern of the client device based on the virtual distance value; and
a memory coupled to the processor and configured to store related data and instructions.

14. The hub device of claim 13, wherein the processor is configured to:
estimate a first physical proximity value between a first user and a first client device and a second physical proximity value between a second user and a second client device within the environment, wherein the first physical proximity value and the second physical proximity value are substantially equal; and
determine a first virtual distance value based on both the obtained environmental status information and the first physical proximity value and a second virtual distance value based on both the obtained environmental status information and the second physical proximity value, wherein the first virtual distance value and the second virtual distance value are substantially different.

15. The hub device of claim 13, the processor is further configured to determine the virtual distance value by increasing or decreasing the physical proximity value based on a client device type of the client device.

16. The hub device of claim 13, wherein the processor is further configured to determine the virtual distance value by increasing or decreasing the physical proximity value based on a contextual device type of the one or more contextual devices.

17. The hub device of claim 13, wherein:
the processor is further configured to predict, based on the virtual distance value, an answer reaction time of the user in response to a first user signaling pattern of the client device,
the processor is further configured to control the user signaling pattern based on the predicted answer reaction time.

18. The hub device of claim 17, wherein:
the processor is configured to increase the virtual distance value based on an expectation that it will be difficult for the user to access the client device; and
the processor is configured to increase the predicted answer reaction time based on the increase of the virtual distance value.

19. The hub device of claim 17, wherein:
the processor is configured to increase the virtual distance value based on an expectation that the user will travel indirectly to the client device to answer a given communication with a given communication type; and
the processor is configured to increase the predicted answer reaction time based on the increase of the virtual distance value.

20. The hub device of claim 17, wherein:
the processor is configured to increase the virtual distance value associated with an interactive video and/or audio interactions relative to non-interactive video, audio, and/or textual interactions; and
the processor is configured to increase the predicted answer reaction time with respect to the interactive video and/or audio interactions relative to the non-interactive video, audio, and/or textual interactions.

21. The hub device of claim 13, wherein the hub device is at least one of the client device, another client device in the environment, a remote device that is outside of the environment, or a combination thereof.

22. The hub device of claim 13, wherein the environment is an Internet of Things (IoT) environment.

23. The hub device of claim 13, wherein:
the processor is configured to track at least one of (i) interactions between the user and the client device, (ii) changes in the environmental status information, (iii) changes in an estimated physical proximity between the user and the client device, or (iv) a combination thereof; and
the processor is configured to determine the virtual distance value based on the at least one of (i) the interactions between the user and the client device, (ii) changes in the environmental status information, (iii) changes in the estimated physical proximity between the user and the client device, or (iv) a combination thereof.

24. The hub device of claim 13, wherein the processor is further configured to adjust a power usage pattern based on the virtual distance value.

25. An apparatus, the apparatus comprising:
means for obtaining environmental status information relating to an environment that includes a client device;
means for estimating a physical proximity value corresponding to a physical distance between the client device and a user of the client device;
means for determining a virtual distance value that is different from the physical proximity value, wherein the determining comprises increasing or decreasing the physical proximity value based on the obtained environmental status information to arrive at the virtual distance value;

means for controlling a user signaling pattern of the client device based on the virtual distance value; and means for storing data and instructions.

26. A non-transitory computer-readable medium comprising code, which, when executed by a processor, causes the processor to perform operations for determining a context-dependent virtual distance, the non-transitory computer-readable medium comprising:

code for obtaining environmental status information relating to an environment that includes a client device;

code for estimating a physical proximity value corresponding to a physical distance between the client device and a user of the client device;

code for determining a virtual distance value that is different from the physical proximity value, wherein the determining comprises increasing or decreasing the physical proximity value based on the obtained environmental status information to arrive at the virtual distance value; and code for controlling a user signaling pattern of the client device based on the virtual distance value.

* * * * *